US012608764B2

(12) United States Patent
Mulligan

(10) Patent No.: US 12,608,764 B2
(45) Date of Patent: Apr. 21, 2026

(54) IMAGE PROCESSING APPARATUS, SYSTEM AND METHOD

(71) Applicant: Sony Interactive Entertainment Inc., Tokyo (JP)

(72) Inventor: Paul Terence Mulligan, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 160 days.

(21) Appl. No.: 18/187,986

(22) Filed: Mar. 22, 2023

(65) Prior Publication Data

US 2023/0316479 A1 Oct. 5, 2023

(30) Foreign Application Priority Data

Mar. 30, 2022 (GB) ...................................... 2204538

(51) Int. Cl.
 *G06T 5/50* (2006.01)
 *G06V 10/24* (2022.01)
 *G06V 10/74* (2022.01)
(52) U.S. Cl.
 CPC .............. *G06T 5/50* (2013.01); *G06V 10/245* (2022.01); *G06V 10/761* (2022.01); *G06T 2207/20164* (2013.01); *G06T 2207/20221* (2013.01)
(58) Field of Classification Search
 CPC .............. G06T 5/50; G06T 2207/20164; G06T 2207/20221; G06T 2210/62; G06V 10/761; G06V 10/245; G09G 5/377; G09G 2340/12; A63F 3/00; A63F 3/00643
 See application file for complete search history.

(56) References Cited

U.S. PATENT DOCUMENTS

| 11,850,514 B2 * | 12/2023 | Simpkinson | .......... A63F 13/497 |
| 2011/0234828 A1 * | 9/2011 | Kunihiro | ................. G06T 7/223 |
| | | | 348/E5.031 |
| 2019/0275411 A1 | 9/2019 | Hansen | |

FOREIGN PATENT DOCUMENTS

| CN | 110882536 A | 3/2020 |
| JP | 2018038441 A | 3/2018 |

OTHER PUBLICATIONS

CN110882536 (English translation of specification) (Year: 2020).*
Combined Search and Examination Report for corresponding GB Application No. 2204538.9, 5 pages, dated Oct. 3, 2022.
Extended European Search Report for corresponding EP Application No. 23160706.0, 9 pages, dated Jul. 25, 2023.

* cited by examiner

*Primary Examiner* — Antonio A Caschera
(74) *Attorney, Agent, or Firm* — Kilpatrick Townsend & Stockton LLP

(57) ABSTRACT

A data processing apparatus includes at least one image sensor to capture one or more first images including a first physical surface for use in a board game, receiving circuitry to receive, via a network, one or more second images including a second physical surface for use in a same type of board game as the first physical surface, image processing circuitry to generate a composite image for display based on at least a portion of a first image and at least a portion of a second image to include, in the composite image, an image of a surface formed of the first physical surface and the second physical surface, and output circuitry to output the composite image for display.

17 Claims, 4 Drawing Sheets

IMAGE PROCESSING APPARATUS, SYSTEM AND METHOD

BACKGROUND OF THE INVENTION

Field of the Invention

The present disclosure relates to image processing.

Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Networked games exist in which two or more computing devices are connected to each other via a network to exchange information during a game session. Users can thus participate in a networked game using their respective computing devices to compete against or play with other users for a variety of game applications.

In particular, networked multiplayer board games allow users to remotely compete against each other using images of a virtual board game. However, such techniques can result in users feeling a lack of interaction with the opposing player, and more generally a lack of human interaction when moving virtual elements within a display image using a pointing device and waiting for an opponent to subsequently update the display image.

It is in the context of the above arrangements that the present disclosure arises.

SUMMARY OF THE INVENTION

Various aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
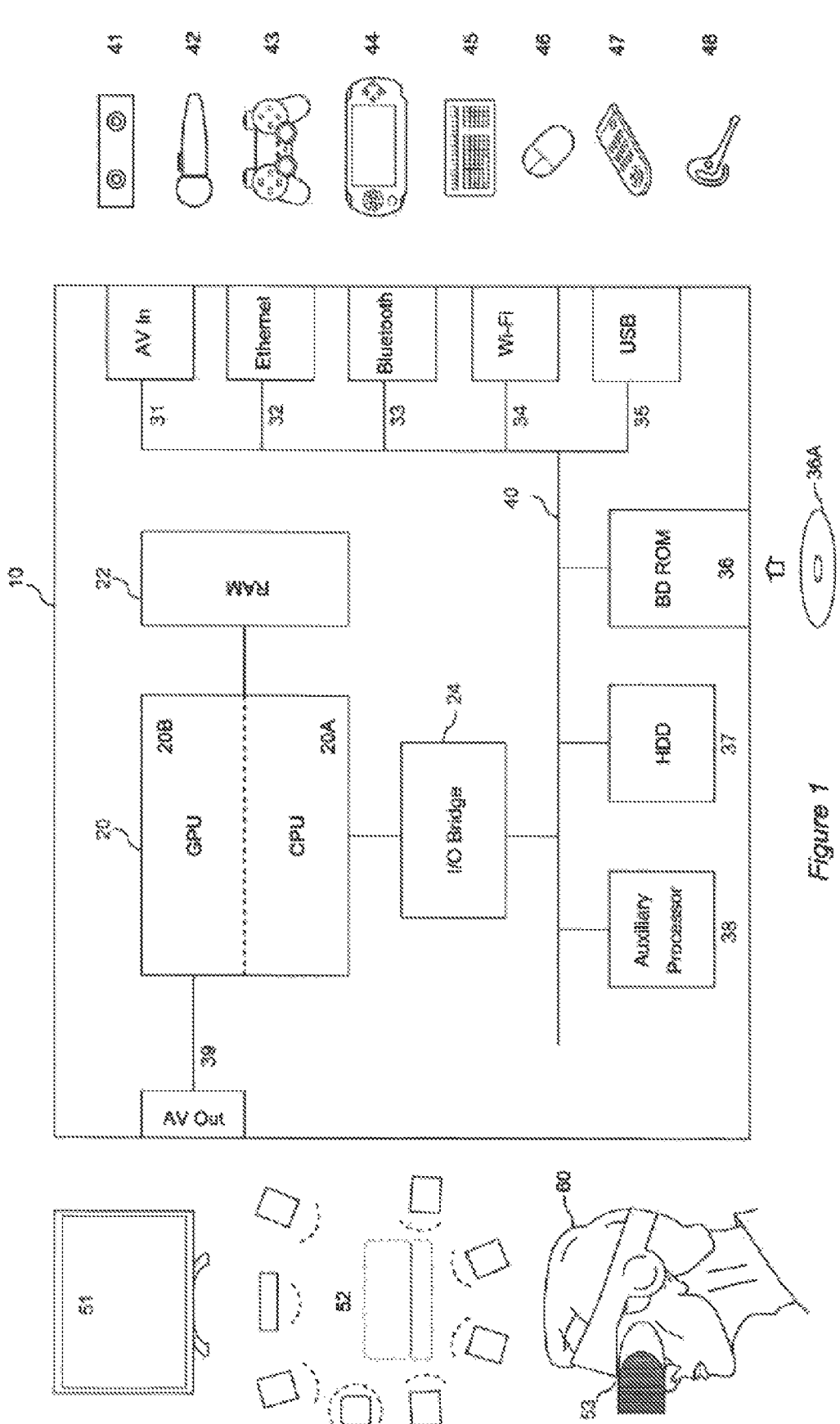
FIG. 1 is a schematic diagram illustrating a computer game processing apparatus.

Referring now to the drawings, wherein like reference numerals designate identical or corresponding parts throughout the several views, FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a data processing apparatus suitable for performing image processing operations for generating images for display by a display device.

Figure 2:
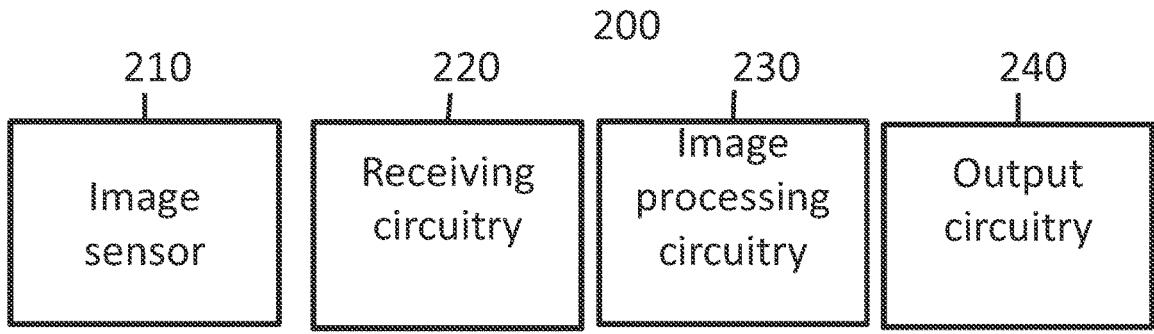
FIG. 2 is a schematic diagram illustrating a data processing apparatus for generating a composite image.

FIG. 2 schematically illustrates a data processing apparatus 200 comprising one or more image sensors 210, receiving circuitry 220, image processing circuitry 230 and output circuitry 240. In embodiments of the disclosure, the data processing apparatus 200 comprises at least one image sensor 210 to capture one or more first images including a first physical surface for use in a board game; receiving circuitry 220 to receive, via a network, one or more second images including a second physical surface for use in a same type of board game as the first physical surface; image processing circuitry 230 to generate a composite image for display based on at least a portion of a first image and at least a portion of a second image to include, in the composite image, an image of a surface formed of the first physical surface and the second physical surface; and output circuitry 240 to output the composite image for display.

The data processing apparatus 200 may for example be provided as part of an entertainment device, such as a game console. Alternatively, the data processing apparatus 200 may be provided as part of a smartphone device or a laptop or a general purpose computing device. In some examples, at least one of the one or more image sensors 210 may be an image sensor, such as a web camera, connected to the data processing apparatus 200 via a wired (e.g. USB) or wireless communication (e.g. Bluetooth® or ZigBee®) and/or at least one image sensor may be a built-in image sensor such as that of a laptop device or a smartphone device.

More generally, the data processing apparatus 200 comprises one or more image sensors 210 configured to capture one or more images of the surrounding environment. The image sensor 210 may use any suitable image sensor technology for capturing a colour image, such as an RGB image sensor capable of capturing an image frame so that RGB colour information is available for each pixel in the captured image. The type of image sensor is not particularly limited and more generally the image sensor is configured to capture one or more colour images.

The image sensor 210 has an associated field of view suitable for capturing an image of the surrounding environment such that the image sensor 210 is capable of capturing one or more images including a physical surface for use in a board game, such as a board having a dimension of N metres by M metres or less, where N and M may be the same or different and N and M are smaller than or equal to 3 metres. A user can therefore arrange the physical surface (e.g. a chess board or sheet including markings for playing a board game) with respect to the image sensor 210 by moving one or both of the image sensor 210 and the physical surface to position the physical surface within the field of view.

Examples of board games for which the physical board can be imaged by the image sensor 210 include: chess; checkers (draughts); noughts and crosses (tic-tac-toe); snakes and ladders; and Go, among others. The type of board game is not particularly limited.

In some cases, a physical board having a physical surface for playing a game may be arranged within the field of view of the image sensor 210 such that at least a portion of the physical surface of the board is imaged by the image sensor 210. In other examples, the physical surface may be a surface of an object such as a table or an overlay surface (e.g. a rubber mat or sheet of material) arranged on a surface of an object such as a table. For example, the image sensor 210 may capture an image including a surface of a table having one or more markings provided thereon for playing a type of board game. In a similar manner, a user may use an overlay for a board game, such as chess, in which the overlay is thin sheet of material (e.g. a fabric overlay) including markings thereon for a game of chess.

The one or more image sensors 210 are configured to capture one or more images (also referred to as first images) including a first physical surface for use in a board game. In the following discussion, the terms "first images" and "second images" will be used to distinguish between the images that are captured by the image sensor(s) 210 and the images that are received by the receiving circuitry 220. The first images are captured by the image sensor(s) 210 locally at the data processing apparatus 200. The second images are received by the receiving circuitry 220 via a network, such as a PAN, LAN or a WAN. For example, the second images may be received via a Bluetooth®, ZigBee® or WiFi® communication or via the internet. The second images have been captured by other image sensors arranged to capture images of another physical surface corresponding to a same type of board game as the physical surface in the first images.

Therefore, a first user local to the data processing apparatus 200 can arrange a first physical surface (e.g. a first chess board) for a board game within a field of view of the image sensor 210. Similarly, a second user can arrange another physical surface (e.g. a second chess board) for a board game within a field of view of an image sensor local to the second user. The second images including the another physical surface used by the second user are received by the receiving circuitry 220. In this way, both the first and second images can be used by the data processing apparatus 200 to generate a composite image for display to the first user, such that the composite image depicts a surface formed of the two respective physical surfaces, and the depicted surface can be viewed by at least the first user for allowing remote play of a board game using their own physical surfaces. Techniques for generating a composite image for display based on at least a portion of a first image and at least a portion of a second image are discussed in more detail later. Hence more generally, two respective images each including a respective rea-world surface are obtained and subjected to one or more image processing operations to generate the composite image.

In some embodiments of the disclosure, a data processing system comprises a first data processing apparatus 200 for a first user and another data processing apparatus 200 for a second user, in which the first and second data processing apparatuses communicate via a network. In this case, since both users have a data processing apparatus 200 as shown in FIG. 2, the first data processing apparatus 200 generates a composite image for display to the first user and the second data processing apparatus 200 generates a composite image for display to the second user. In this case, the first data processing apparatus 200 (shown in FIG. 2) further comprises transmission circuitry (not shown in FIG. 2) configured to transmit data indicative of one or more of the first images, so that data for one or more first images can be transmitted to the second data processing apparatus 200, via the network, for use in generating a composite image by the second data processing apparatus 200. Therefore, in some embodiments of the disclosure, the data processing apparatus 200 optionally comprises transmission circuitry configured to transmit data for one or more of the first images captured by one or more of the image sensors 210 associated with the data processing apparatus 200.

However, it will be appreciated that in other more preferable cases the second user may not require a data processing apparatus 200 as shown in FIG. 2. Instead, the first user may have a data processing apparatus 200 as shown in FIG. 2 and the second user may instead have a simplified data processing apparatus that transmits, via the network, data for the images captured for the second user's board game and then receives from the data processing apparatus 200, via the network, data for a composite image that has been generated by the first user's data processing apparatus 200. In this way, processing for generating the composite image may advantageously be performed by a single device, and data for the composite image can be communicated, via the network, for reception by the data processing apparatus associated with the second user. Hence, in some examples data for the composite image may be communicated, via a network, to another data processing apparatus for display to another user.

Figure 3:
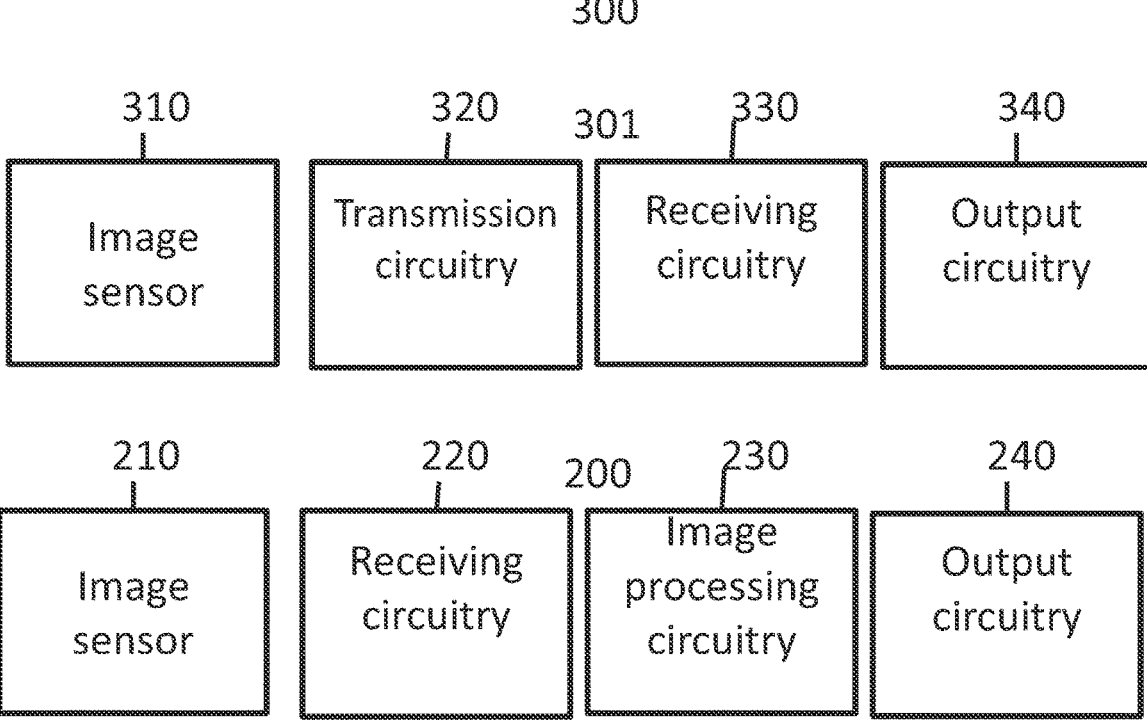
FIG. 3 is a schematic diagram illustrating a system.

Referring now to FIG. 3, in some embodiments of the disclosure a data processing system 300 comprises a first data processing apparatus 200 associated with a first user and a second data processing apparatus 301 associated with a second user, in which the first data processing apparatus 200 and the second data processing apparatus 301 communicate via a network, and in which the second data processing apparatus 301 comprises: one or more image sensors 310 to capture the one or more second images including the second physical surface; transmission circuitry 320 to transmit data for the one or more second images for reception by the first data processing apparatus 200; receiving circuitry 330 to receive data for the composite image generated by the first data processing apparatus 200, the composite image having been generated based on one or more of the second images and one or more first images captured by the image sensor 210; and output circuitry 340 to output the composite image for display to the second user. Hence in the system 300, the data processing apparatus 200 is configured to generate the composite image and transmit data for the composite image for reception by the data processing apparatus 301. In some examples, the data processing apparatus 200 may output the composite image to an external apparatus (e.g. one or more intermediate processing devices) and the external apparatus may transmit the data for the composite image via the network. Alternatively or in addition, the data processing apparatus 200 may comprise transmission circuitry (not shown in FIG. 3) configured to transmit data for the composite image to the data processing apparatus 301, via the network.

Hence more generally, in some embodiments of the disclosure the data processing apparatus 200 comprises transmission circuitry configured to transmit data for at least one of: one or more first images captured by the image sensor 210; and a composite image generated by the image processing circuitry 230. In this way, first images can be provided to another apparatus associated with a second user for generating a composite image thereat and/or the composite image can be provided, via the network, to thereby allow the two users to jointly participate in a board game using their respective physical surfaces (e.g. surfaces of respective physical boards) and viewing the composite image generated by a respective one of the data processing apparatuses.

Referring again to FIG. 2, the data processing apparatus 200 comprises the image processing circuitry 230 configured to generate the composite image for display based on at least a portion of a first image and at least a portion of a second image so that the composite image includes an image of a surface formed of the first physical surface and the second physical surface. The image processing circuitry 230 generates the composite image based on at least one first image and at least one second image so that the composite image includes a representation of a surface that is formed using the first physical surface and the second physical surface. In this way, the composite image includes a visual representation formed from both the real-world surface used by the first user and the real-world surface used by the second user, and the users can view the composite image whilst using their respective real-world surface (e.g. moving pieces thereon or drawing or otherwise marking or updating the surface) and updates to a respective real-world surface can be reflected in the composite image.

For example, at least a portion of the first physical surface from the first image and at least a portion of the second physical surface from the second image may be overlaid with each other and a transparency for at least the overlay image (also referred to as an upper image) adjusted so that at least some of the first physical surface is visually represented in the composite image and at least some of the second physical surface is visually represented in the composite image. In some examples, the first image and the second image may have a same size (same dimensions) and the two images may be overlaid with each other and one of the images set as the overlay image and the other as the background image, and a transparency increased for at least some of the pixels of the overlay image. In other examples, image scaling may be applied to one or both of the first image and second image to resize at least one of the images to allow two images of substantially the same size to be overlaid (e.g. rescaling may be applied whilst maintaining a same aspect ratio or an aspect ratio for at least one of the images may be adjusted).

Alternatively or in addition, in some examples a portion of the first physical surface from the first image and a portion of the second physical surface from the second image may be cut out and arranged within the composite image so as to be juxtaposed with each other so that at least some of the first physical surface is visually represented in the composite image and at least some of the second physical surface is visually represented in the composite image. This may be performed to first cut out two image portions from the first and second images, respectively, and then overlay the two image portions as discussed above. Hence in some examples, rather than using an entirety of a first image and a second image and overlaying the two, a portion of at least one of the images may be cut out and used either as the upper image or the background image.

In some examples one or more portions of the first image may be selected and one or more portions of the second image may be selected, and the composite image may be generated by compositing selected portions from the two images. Techniques for detecting portions of respective images and selecting respective portions are discussed in more detail later.

Hence more generally, the composite image may be generated by compositing image data for a first image and image data for a second image so that at least some of the first physical surface and at least some of the second physical surface is visually represented in the image.

The data processing apparatus 200 comprises the output circuitry 240 configured to output the composite image for display. The data processing apparatus may be connected to a display device via a wired or wireless communication to output the composite image for display by the display device. Alternatively or in addition, the data processing apparatus 200 may optionally comprise a display unit (not shown in FIG. 2) configured to display the composite image output by the output circuitry 240. For example, the data processing apparatus 200 may be a smartphone or tablet device and the output circuitry 240 may output the composite image for display by the display unit of the device. In some examples, the output circuitry 240 may be configured to output the composite image to a display device, via a wireless communication (e.g. Bluetooth®), for display by the display device. For example, a user may wear a head-mountable display (HMD) and data for the composite image may be communicated for display by the HMD (optionally, known compression techniques may be used to compress image data for the composite image). For example, the user may wear a so-called mixed reality or augmented reality HMD with a see-through display so that the composite image can be displayed by the HMD whilst allowing the user to physically interact with a chess board or checkers board, or other similar board game.

Hence more generally, the data processing apparatus 200 outputs a composite image for display to a user, in which the composite image includes a first image captured for the user's board game surface and a second image captured for another user's board game surface and the users can jointly participate in a board game using their own physical pieces (or other means as appropriate for a board game) whilst viewing the composite image to view both their own physical pieces and the physical pieces of their opponent(s). This provides a greater level of interaction for a user when remotely playing a board game.

In some cases, each user may arrange the image senor 210 with respect to their game board such that the captured image can be used to generate the composite image without requiring an adjustment of the captured image to change a property for the captured image such as size, position and/or orientation. For example, the user may arrange the image sensor 210 to capture an image from a viewpoint above the physical surface and position the image sensor 210 relative to the physical surface so that the physical surface occupies a central region of the field of view. The other user may similarly arrange the image sensor 310 to capture an image from a viewpoint above the other physical surface. Therefore, in the case where the two respective physical surfaces are arranged in a central portion of the field of view of the associated image sensor, the image processing circuitry 230 can thus be configured to generate the composite image by overlaying the first and second images without adjustment of the first and second images.

In particular, a first image frame can be set as a base image (also referred to as a background image) and the second image frame can be set as the overlay image (also referred to as an upper image or over image) to be overlaid (optionally without requiring a positional offset or other alignment for the image frames) on the base image. It will be appreciated that either of first image frame and the second image frame may be set as the base image and the other as the overlay image. A transparency property (or similarly opacity property) can be selected for the overlay image (either for the whole overlay image or for one or more portions of the overlay image). In some examples, the image processing circuitry 230 can be configured to set a transparency of 50% (or set an alpha value of 0.5 when a value of 0.0 represents full transparency and a value of 1.0 represents no transparency) for the overlay image as a default setting. In this way, the second image frame can be superimposed on the first image frame (or vice versa) for the composite image and the user can view the composite image to view a representation of a surface formed of the first physical surface and the second physical surface.

Hence more generally, in some embodiments of the disclosure the image processing circuitry 230 is configured to overlay the first image and the second image, set one of the first image and the second image as an overlay image, and increase a transparency for at least some of the overlay image. In particular, the image processing circuitry 230 can set one of the first image and the second image as an overlay image and increase a transparency for the image set as the overlay image to thereby allow the image set as the base image to be viewed through the overlay image when viewing the composite image generated in this way.

The pixel data for an image may comprise RGB values for each pixel for representing the colour of the pixel (e.g. 24 bits per pixel with 8 bits for R, G and B, respectively). An alpha value corresponding to partial transparency can be set for at least some of the pixels of the image so that a pixel is partially transparent. When such an image is used as an overlay image, a corresponding pixel in the base image will show through the overlaid and partially transparent pixel in the overlay image.

The image processing circuitry 230 can for example set an alpha value for a pixel in the overlay image to have a value in the range 0.1-0.9 (or more preferably in the range 0.3-0.7), where a value of 0.0 corresponds to full transparency and a value of 1.0 corresponds to a fully opaque pixel. In this way, alpha blending of a pixel in the overlay image and a corresponding overlapping pixel in the base image can be performed to blend the two images for generating the composite image. Specifically, a colour component (e.g. red, green or blue) of a pixel in the composite image can be calculated by blending the colour component for the pixel in the overlay image with the corresponding pixel in the base image using a weighting that is dependent on the alpha value set for the pixel in the overlay image. Any suitable alpha blending calculation may be used.

Hence more generally, the image processing circuitry 230 can be configured to generate the composite image for display by overlaying the first image and the second image, setting one of the first image and the second image as an overlay image, increasing a transparency for at least some of the pixels of the overlay image, and blending the two images based on the transparency of the overlay image. In some examples, the image processing circuitry 230 can be configured to calculate a colour component for a pixel of the composite image based on: a colour component for a corresponding pixel in the first image, an alpha value for the corresponding pixel in the first image, and a colour component for a corresponding pixel in the second image.

In some examples, the image processing circuitry 230 may specifically set the first image (which has been captured by the image sensor 210) as the overlay image and set the second image as the base image. The pixels in the first image corresponding to the physical surface can be identified and a transparency increased for the identified pixels without adjusting a transparency for other pixels in the first image not corresponding to the physical surface. For example, an alpha value in the range 0.1-0.9, and more preferably in the range 0.3-0.7, may be set for the pixels corresponding to the physical surface in the first image. In this way, just the portion of the first image corresponding to the physical surface (e.g. a chess board) may be made partially transparent to allow the other user's physical surface to be viewed in the composite image, and the surrounding portions of the first image can be included in the composite image with full (or at least near full) opacity. Consequently, the image processing circuitry 230 can generate the composite image for display such that the first user can view the portions of the first image surrounding the first physical surface (for example, so as to give the user the impression of viewing their game board on the table in their surrounding environment), while viewing both the first and second physical surfaces in superimposed manner.

In some examples, a transparency for one more portions of the image set as the background image may optionally be adjusted. Hence, in some examples, a transparency may be adjusted for both at least a portion of the overlay image and at least a portion of the background image. For example, to achieve an effect similar to that discussed in the previous paragraph, the first image may be set as the background image and the second image may be set as the overlay image, and a portion of the second image corresponding to the physical surface in the second image may be set to have a transparency in the range 0.1-0.9, and more preferably in the range 0.3-0.7, whilst other portions of the second image may be set to have a transparency in the range 0.0-0.2 (or in some cases se to substantially zero) so that the portion of the first image surrounding the first physical surface can be viewed in the composite image.

In some examples, the image processing circuitry 230 may initially generate a composite image by cropping the first and second images and then arranging the first image in juxtaposition with the second image so that the first image is used to represent a given portion (e.g. substantially half or 10, 20, 30 or 40%) of the surface in the composite image and the second image is used to represent the remaining portion of the surface in the composite image. Such image processing may be performed to initially generate the composite image at a beginning of a game when first pieces used by a first user are positioned at one side of the board and second pieces used by a second user as positioned at the other side of the board.

In some cases, the cropped first image may be arranged in juxtaposition with the cropped second image such that an edge of the cropped first image coincides with an edge of the cropped second image to provide a boundary between the two images for providing a presentation of a continuous surface. In a manner similar to that described above, in some cases the first and second images may be cropped and arranged so that at least a portion of the cropped first image is overlaid with a portion of the cropped second image and a transparency value set (e.g. 0.5) for an overlapping portion of the overlay image. In this way, the composite image can be generated to reduce or remove the appearance of an abrupt boundary between the first surface and the second surface in the composite image.

In some embodiments of the disclosure, the image processing circuitry 230 is configured to select one or more portions of the first image and one or more portions of the second image and generate the composite image using one or more of the selected portions. The image processing circuitry 230 can optionally generate the composite image by selecting one or more portions of the first image and selecting one or more portions of the second image and using some or all of the selected portions in the composite image. Various techniques may be used for selecting a portion of an image to be included in the composite image. In some examples, an image analysis may be performed to detect a physical piece (e.g. chess piece or checker piece) or a marker included in the first image (or the second image) and a portion of the first image (or the second image) including the physical piece or marker can be selected for inclusion in the composite image.

In some examples, the image processing circuitry 230 may be configured to initially overlay the first image and the second image and, for a first portion of the first image and a second portion of the second image overlapping the first portion, the image processing circuitry 230 can select one of the first portion and the second portion for inclusion in the composite image. In other words, the composite image can be generated such that a given area within the composite image comprises data from either a corresponding portion of the first image or a corresponding portion of the second image. In particular, in the case of a chess board, for example, the composite image may be generated to include an image of a chess board in which the respective squares of the chess board sum to 64, in which each of the squares has been selected from either the first image or the second image.

The image processing circuitry 230 can be configured to execute one or more contour detection algorithms for detecting one or more features in a captured image. Various features such as a structure or shape present on the physical surface for the board game can be detected. As such, in the case of a chess board (or similar game board) having an array of squares with alternate colours, the contours associated with the squares can be detected in the first and second images to thereby detect respective squares in the first and second images. In some examples, the image processing circuitry 230 can be configured to select portions of the first image and/or the second image corresponding to the squares, detected through contour detection, and in the case of two overlapping square portions (one in the first image and one in the second image), select one of the square portions for inclusion in the composite image. In this way, the composite image can be generated by selecting square portions from the first and second images.

In some examples, the image processing circuitry 230 may be configured to select a predetermined number of respective portions (e.g. square portions) for inclusion in the composite image. For example, the image processing circuitry 230 may be configured to select a predetermined number of respective portions comprising one or more from the list consisting of: 9, 64 and 100. In particular, in the case of the first image and second image including two respective chess boards, the image processing circuitry 230 may select the square portions to generate a composite image comprising 64 square portions.

In addition, in the case of two users playing a game using physical pieces on their respective surfaces (e.g. using chess pieces or checkers pieces), the image processing circuitry 230 can be configured to execute one or more contour detection algorithms for detecting one or more square portions having a uniform colour within the perimeter of the square portion (thus corresponding to a portion of a board not occupied by physical piece) and also detect one or more square portions having a non-uniform colour within the perimeter of the square portion (corresponding to a portion of a board occupied by a physical piece). In this way, a detected portion (or more specifically a square portion in the case of some game boards) including a physical piece can be preferentially selected for inclusion in the composite image. Therefore, square portions including physical pieces in the first image can be preferentially selected and square portions including physical pieces in the second image can be preferentially selected, to thereby generate a composite image including selected portions for providing a composite image of a board game.

For example, the image processing circuitry 230 may detect a square portion using contour detection and perform an analysis of the pixels values for a plurality of pixels within the detected square portion. An analysis of pixel values for a row of pixels extending from one side of the square portion to an opposite side of the square portion may be performed. Alternatively, the image processing circuitry may perform an analysis of the pixels values for a square portion by grouping (binning) pixel values for each of the pixels within the square portion into ranges. The presence of at least a threshold number of pixels (e.g. a given proportion of the total number of pixels in the square portion) with values within a first pixel value range and at least a threshold number of pixels with values within a second pixel value range indicates the presence of two different colours for the square portion. In the case of a black (or brown or similarly dark) coloured square on a board with a different coloured piece arranged thereon (e.g. a white chess piece), the presence of at least a threshold number of pixels in the first pixel value range and at least a threshold number of pixels in the second pixel value range for a square portion will thus indicate the presence of an element or piece arranged on the square portion. In this way, a square portion (or another similar portion of a surface of a board game detected using contour detection) including a physical piece (e.g. a game piece for the board game) can be detected and the square portion can be selected for inclusion in the composite image.

Therefore, the image processing circuitry 230 can obtain a plurality of selected image portions from the first image and a plurality of selected image portions from the second image, and composite the selected image portions to generate the composite image.

In some embodiments of the disclosure, the first image includes one or more first physical objects arranged on the first physical surface and the second image includes one or more second physical objects arranged on the second physical surface, and the image processing circuitry 230 is configured to generate the composite image for display to include at least one first physical object and at least one second physical object in the image of the surface presented in the composite image. This may be achieved by selecting portions of the first image including an object and selecting portions of the second image including an object so as to generate the composite image using the selected portions, for example using the contour detection techniques described above. Alternatively, this may be achieved by overlaying the first image and the second image (both including one or more first physical objects and one or more second physical objects, respectively) and increasing a transparency for the image set as the overlay image so that both the first surface, the first physical object(s), the second surface and the second physical object(s) are capable of being viewed in the composite image. Alternatively, this may be achieved by overlaying the first image and the second image (both including one or more first physical objects and one or more second physical objects, respectively), detecting portions of the first image including an object, detecting portions of the second image including an object, and setting a low transparency (high opacity) for detected portions including an object and setting a high transparency (low opacity) for other portions of the first and second images. In this latter case, portions, such as respective square portions, may be identified through contour detection as discussed above.

In some cases due to differences in the arrangement of the image sensor with respect to the surface for the board game, the image processing circuitry 230 may apply one or more adjustments to one or both of the first and second images for generating the composite image.

In some embodiments of the disclosure, the image processing circuitry 230 is configured to generate the composite image by adjusting at least one of the first image and the second image. A user may attempt to position their surface (e.g. game board) with respect to the image sensor to allow an image to be captured including the surface. However, the relative alignment and/or positioning of the surface with respect to the image sensor may not be the same for both users such that overlaying the two images results in a poor quality composite image. The image processing circuitry 230 can be configured to adjust the first image and/or the second image so as to improve a degree of alignment between the first image and the second image when they are overlaid together. The image processing circuitry 230 can be configured to adjust the first image relative to the second image, or vice versa, or adjust both the first and second images, to improve a matching between the two images.

In some embodiments of the disclosure, the image processing circuitry 230 is configured to adjust, for at least one of the first image and the second image, one or more from the list consisting of: a size of the image; a transparency of at least some of the image; a position of the image within the composite image; and an orientation of the image within the composite image.

In some cases, the first user may have positioned their associated image sensor closer to the first surface and the second user may have positioned their associated image sensor further away from the second surface. This can result in the first image captured for the first user including a surface corresponding to a larger portion of the captured image, such that the first physical surface appears larger than the second physical surface when the images are overlaid. The image processing circuitry 230 can be configured to adjust a size of the first image and/or the second image to reduce a difference between the size of the first physical surface and the size of the second physical surface. One or both of the first image and the second image can be re-sized using image scaling. Optionally, An aspect ratio of one or both of the first image and the second image may be adjusted. In some examples, the image processing circuitry 230 is configured to increase a size of one of the first image and the second image and reduce a size of the other for the first image and the second image, to thereby reduce a difference between a size of the first physical surface and the second physical surface in the respective first and second images.

In some cases, the image processing circuitry 230 is configured to adjust a size of at least one of the first image and the second image by cropping the image. The image processing circuitry 230 can in some cases crop at least one of the first and second images and then scale the cropped image to increase or decrease a size of the image (and thus the size of the physical surface represented in the image) to improve a degree of match between the first and second images. The first and second images can thus be overlaid with at least one of the images having been resized to obtain a composite image with improved quality.

Hence more generally, in some embodiments of the disclosure the image processing circuitry 230 is configured to adjust a size of at least one of the first image and the second image relative to the other of the first image and the second image to reduce a difference between a size of the first physical surface and a size of the second physical surface.

In some cases, the first user may have positioned the physical surface with respect to the image sensor and the physical surface may be offset with respect to the centre of the field of view. The physical surface may therefore be arranged within the first image such that the centre of the physical surface is offset with respect to the centre of the first image. The image processing circuitry 230 can be configured to adjust a position of the first image with respect to the composite image to reposition the physical surface with respect to the composite image. The image processing circuitry 230 can similarly be configured to adjust a position of the second image with respect to the composite image to reposition the physical surface in the second image with respect to the composite image. In this way, at least one of the first physical surface and the second physical surface can be repositioned with respect to the composite image to improve an alignment of the two surfaces and thus improve a quality of the composite image. A positional translation of at least one of the first image and the second image can thus be performed to align a centre of the surface with a centre of the composite image. For example, a corner detection algorithm may be used to detect corners of the physical surface in the first image (and/or the second image) and the first image can be bulk shifted in one or more directions with respect to the composite image so that the corners are arranged substantially symmetrically with respect to the centre of the composite image.

Hence, a position of at least one of the first and second images can thus be adjusted to improve alignment of the two images for generating the composite image to thereby improve a quality of the composite image.

In a manner similar to that described above, in some cases the first and second users may have positioned their physical surfaces with different angles of alignment relative to the image sensor so that overlaying the two images results in a composite image with poor quality. The image processing circuitry 230 can be configured to adjust an orientation of at least one of the first image and the second image with respect to the composite image. The image processing circuitry 230 may optionally crop the first and/or second images and adjust an orientation of a cropped image(s). In this way, at least one of the first physical surface and the second physical surface can be repositioned within the composite image to improve an alignment of the two surfaces and thus improve a quality of the composite image. For example, the image processing circuitry 230 can adjust an orientation of at least one of the first image and the second image to align an edge associated with the physical surface with either a horizontal or vertical axis for the composite image.

Hence more generally, one or more geometric properties may be adjusted for one or both of the first and second images for generating the composite image to thereby improve a quality of the composite image.

Figure 4A:
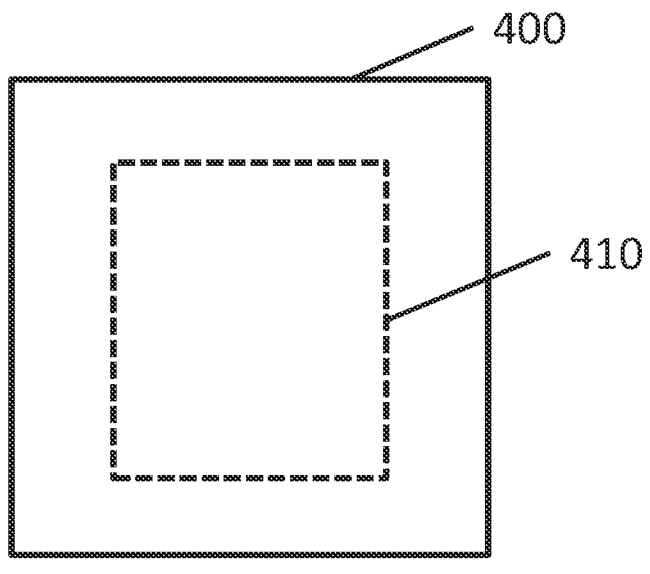
FIG. 4a is a schematic diagram illustrating an example of a first image and a composite image generated using the first image.

FIG. 4a is a schematic diagram showing an example of a first image 400 having a larger size than a composite image 410 to be generated using the first image 400. The first and second images may have a size that is substantially the same, so that both the first and second images have a size as shown in FIG. 4a. For simplicity, only the first image and the composite image are shown in FIG. 4a. In some examples, the composite image may be generated using image data extracted from a portion of the first image and/or image data extracted from a portion of the second image. In this way, a size, position and/or orientation of at least one of the first image and the second image can be adjusted as needed to improve a degree alignment for the physical surfaces in the two images whilst allowing the composite image to be generated using a portion of an adjusted image. In some cases, due to the use of different image sensors, the first image and the second image may have a different size and/or different aspect ratio. In the example of FIG. 4a, the first image 400 and composite image 410 are both shown as having a square area (same number of pixels in the horizontal and vertical directions), however in other examples at least one of the first image, the second image and the composite image may have a rectangular area with a greater number of pixels in the horizontal direction than the vertical direction. For example, the first and second images may in some cases be wide field of view images and the composite image may have a square shape or a rectangular shape. More generally, the composite image can be generated with a size that is smaller than that of the first and second images so that geometric properties of the two images can be adjusted without loss of image data for a portion of the composite image.

In some embodiments of the disclosure, the image processing circuitry 230 is configured to detect one or more corners associated with the first physical surface and the second physical surface and to adjust the first image with respect to the second image in dependence upon positions of the corners and/or adjust the second image with respect to the first image in dependence upon the positions of the corners. The image processing circuitry 230 can be configured to detect one or more corners associated with the first physical surface in the first image and the second physical surface in the second image and to adjust one image with respect to the other image in dependence upon positions of the corners other so that a corner in one image is substantially coincident with a corner in the other image when the two images are overlaid. In some cases, the first and second image may both be adjusted with respect to each other so that a corner in the first image is substantially coincident with a corner in the second image when the two images are overlaid.

Figure 4B:
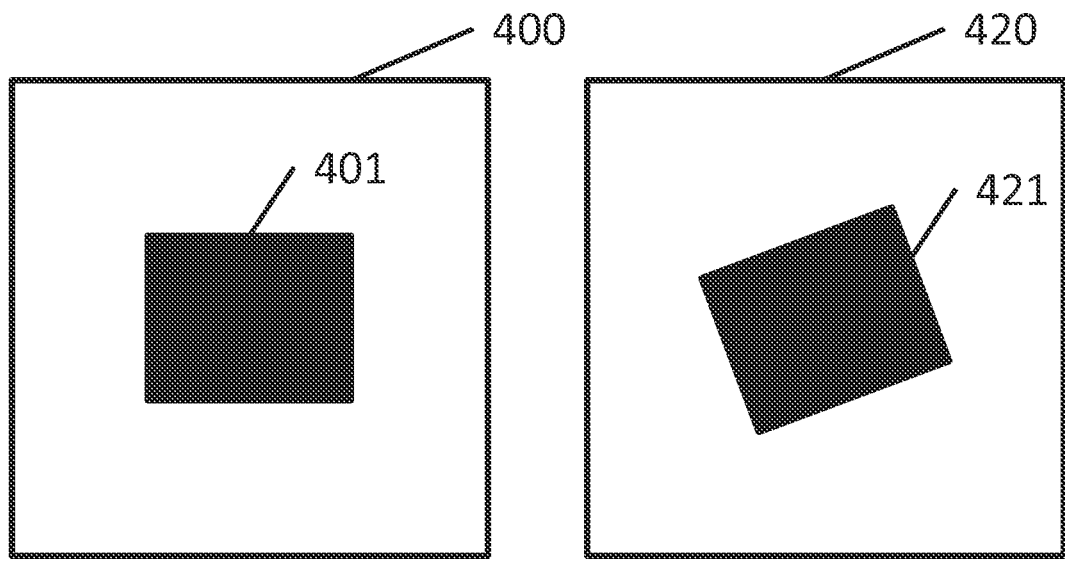
FIG. 4b is a schematic diagram illustrating an example of adjusting a first image and a second image based on corner detection.

FIG. 4b is a schematic diagram showing an example of the first image 400 and a second image 420. In this example, the first and second images are shown as having a same size. The first image 400 includes a first physical surface 401 having four corners, and the second image 420 includes a second physical surface 421 having four corners.

The image processing circuitry 230 may use any suitable corner detection algorithm to detect a position in an image at which two edges meet and thereby detect a positon of a corner (e.g. Harris corner detection algorithm). The image processing circuitry 230 can overlay the first image 400 and the second image 420 and detect whether a separation (e.g. in units of distance or numbers of pixels) between a corner in the first image and a corner in the second image is less than a threshold separation. In response to detecting that a separation between a corner in the first image and a corner in the second image is less than the threshold separation, the image processing circuitry 230 can adjust a position and/or orientation at least one of the images so that the two corners are coincident with each other in the composite image. Optionally, one of the images may be bulk shifted to align the corners or both of the images may be bulk shifted to align the corners. Optionally, one of the images may be rotated or both of the images may be rotated. Hence, when two users have aligned their respective game boards with respect to their image sensors and there is a relatively small degree of misalignment, the presence of two corners within a threshold separation of each other can be detected and used to perform an adjustment for improving the quality of the composite image.

Alternatively or in addition, in the case of a game board having Y corners (e.g. Y=4, 5 or 6, for example in the case of a 5 sided game board that may be used for a three player chess board), the image processing circuitry 230 can detect the Y corners in the first image and the Y corners in the second image, and optionally adjust a size of at least one of the first and second images and optionally adjust a position and/or orientation of at least one of the first and second images so that when overlaid each of the Y corners in the first image and the second image are coincident. The image processing circuitry 230 may use any suitable corner detection algorithm.

Alternatively or in addition, in some examples the first physical surface and the second physical surface may each comprise one or more optically detectable markers for use as reference points on the surface. An optically detectable marker may be arranged at a centre and/or at a corner of the first surface (e.g. a corner of a chess board or a centre of the chess board), and an optically detectable marker may be similarly arranged on the second surface. In this way, the optically detectable markers can be used to define corresponding reference points on the first and second surfaces and the image processing circuitry 230 can adjust the first image and/or the second image so that the first and second images are overlaid together with the optically detectable markers being substantially coincident.

Hence in some cases, a first optically detectable marker may be provided on the first physical surface and a second optically detectable marker may be provided on the second physical surface and the image processing circuitry 230 can overlay the first and second images and perform adjustment of the position for the first and/or second image so that the positions of the first and second optically detectable markers are substantially coincident. Similarly, a plurality of first optically detectable markers may be provided on the first physical surface and a plurality of second optically detectable markers may be provided on the second physical surface. The image processing circuitry 230 can thus overlay the first and second images and perform one or more types (e.g. size, position and/or orientation) of adjustment for the first and/or second image so that each first optically detectable marker is coincident with a second optically detectable marker. In some examples, a respective ID number may be associated with each first optically dateable marker, and a respective ID number may be associated with each second optically dateable marker, in which at least one ID number associated with the first image matches an ID number associated with the second image, and adjustment of one or both of the first and second images can be performed on the basis of the respective ID numbers so that a first and second optically detectable marker corresponding to the same ID number are coincident for generating the composite image.

In some examples, a detection of a respective corner and a first optically detectable marker in the first image and a detection of a respective corner and a second optically detectable marker in the second image may be used to perform the adjustment so that the two corners are coincident in the composite image and the two optically detectable markers are coincident in the composite image. Hence, in some examples a single corner in each of the first and second image and a single marker in each of the first and second image may be used to perform the image adjustment.

In some examples, the first physical surface and the second physical surface each have one or more optically detectable markers, in which each optically detectable marker comprises a two-dimensional bar code, such as a QR code. The two-dimensional bar code can be used to indicate that the marker corresponds to a given corner or a centre of the surface (e.g. by indicating a predetermined ID number associated therewith), and can be used by the image processing circuitry 230 to match corresponding points on the two respective surfaces.

Hence, in some embodiments of the disclosure the image processing circuitry 230 is configured to detect one or more of the corners by detecting one or more optically detectable markers in at least one of the first image and the second image.

Figure 5:
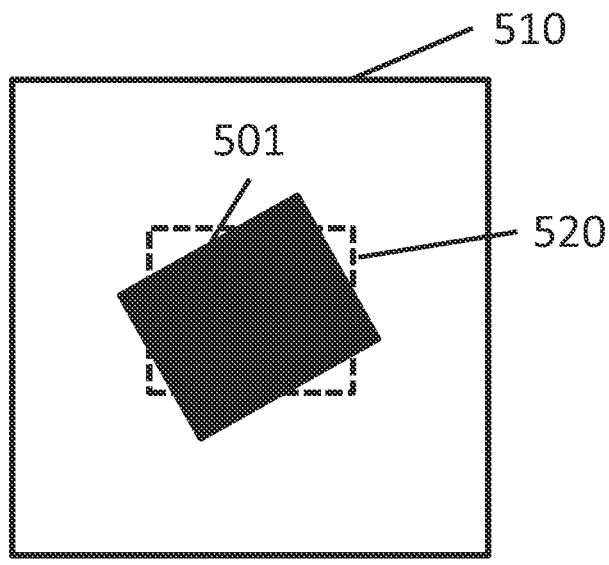
FIG. 5 is a schematic diagram illustrating an example of a composite image including a graphical indicator.

In some embodiments of the disclosure, the image processing circuitry 230 is configured to generate the composite image for display to include one or more graphical indicators indicative of a target position and/or orientation for the first physical surface with respect to the image sensor. The composite image may comprise a graphical indicator in order to provide a user with visual guidance as to how to position their physical surface (e.g. game board) with respect to the image sensor. FIG. 5 is a schematic diagram showing an example of a composite image 510 including a first physical surface 501 and a graphical indicator 520 for indicating a target position and orientation for the first physical surface 501. In this example, the graphical indicator 520 is shown in the form of a dashed four sided shape indicating the desired position and/or orientation. In other examples, the graphical indicator 520 may take the form of a single line (solid or dashed), such as a red line in the composite image, for providing the user with a line with which to align an edge of the physical surface. Alternatively or in addition, the graphical indicator 520 may comprise one or more arrows indicating direction and/or orientation. The form of the graphical indicator is not particularly limited. Generally, the composite image can be generated to include the graphical indicator at a position and/or orientation within the composite image for providing a user with a visual guide for positioning the physical surface with respect to the image sensor. The composite image may be initially generated to include one or more of the graphical indicators during a setup stage to assist the user in positioning the physical surface and the image sensor, and subsequently (e.g. in response to a user input indicating an end of the setup stage) the composite image can be generated without the graphical indicators.

Therefore, upon completion of the setup stage, the degree of alignment may be such that the above mentioned geometric adjustment of one or both of the first and second images may not be required. Optionally, the above mentioned geometric adjustments of one or both of the first and second images may subsequently be performed by the image processing circuitry 230 for the first and/or second images in response to receiving a user input indicating that the setup stage has been completed. In particular, the image processing circuitry 230 can be configured to operate in a first mode for generating the composite image comprising a graphical indicator and switch to a second mode in response to a user input, in which the image processing circuitry 230 is configured to adjust one or more geometric properties of at least one of the first and second images in the second mode to improve a degree of match for the respective physical surfaces for use in generating the composite image.

In some embodiments of the disclosure, the image sensor 210 is configured to capture the first images according to an imaging frame rate, the receiving circuitry 220 is configured to receive the second images via the network, and the image processing circuitry 230 is configured to generate a sequence of composite images for display in response to the first images and the second images. The image sensor 210 may have any suitable imaging frame rate for capturing consecutive image frames (e.g. 30, 60 or 120 frames per second).

Similarly, the second images are captured by the image sensor 310 having any suitable frame rate, and data for the second images is received by the receiving circuitry 220. The frame rates associated with the first images and the second images may be the same or may be different. The image processing circuitry 230 is configured to generate the composite image in response to the first and second images. The image processing circuitry 230 is configured to generate the composite image based on a most recent first image (current first image) and a most recent second image (current second image). In some cases, a most recent first image and a most recent second image are combined using the techniques discussed above to obtain the composite image.

In some embodiments of the disclosure, the image processing circuitry 230 is configured to generate at least one composite image for display by updating a previous composite image based on one or more from the list consisting of: a difference between a previous first image and a current first image; and a difference between a previous second image and a current second image. A difference between a previous first image and a current first image and/or a difference between a previous second image and a current second image can be sued for updating a previously generated composite image. For simplicity of explanation, the following will be discussed with respect to a sequence of the first images but can similarly be applied using a sequence of the second images. A previous first image in the sequence of captured first images can be compared with a current first image in the sequence. Image comparison is performed to calculate a difference between each pixel in the previous first image and the current first image. The image processing circuitry 230 can thus compare the previous and current first images and output a difference image frame, in which the difference image frame comprises pixel data for the pixels in the current image frame that are different from the previous image frame (one or more threshold conditions may be used for this pixel comparison). The image processing circuitry 230 can thus generate the composite image by updating a previous composite image based on the difference image frame. Therefore, in the case of a game of chess, for example, a user may move a piece from one position of the board to another position of the board, and as such the a previous image captured at a first time (T1) and a current image captured at a later time (T2) can be compared and pixel data for the pixels in the current image frame that are different from the previous image frame can be used to update a previously generated composite image. The previous image frame and current image frame may be consecutive image frames or there may be one or more intervening image frames there between.

It will be appreciated that typically in an embodiment of the disclosure, the image processing circuitry of the data processing apparatus is configured to adjust at least one of the first or second images to align the first and second physical surfaces used in a board game, identify differences in the physical surfaces between the first and second images, and output a composite image that preserves the identified differences. The mutual differences should thus generate an image showing the real-world pieces on the game board from both parties.

Figure 6:
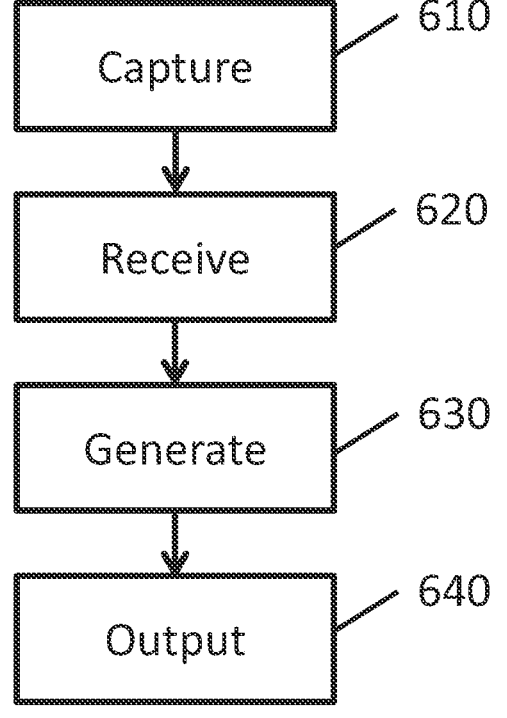
FIG. 6 is a schematic diagram illustrating a data processing method.

Referring now to FIG. 6, in embodiments of the disclosure a data processing method comprises: capturing (at a step 610), by an image sensor, one or more first images including a first physical surface for use in a board game; receiving (at a step 620), via a network, one or more second images including a second physical surface for use in a same type of board game as the first physical surface; generating (at a step 630) a composite image for display based on at least a portion of a first image and at least a portion of a second image so that the composite image includes an image of a surface formed of the first physical surface and the second physical surface; and outputting (at a step 640) the composite image for display.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing apparatus, comprising
   at least one image sensor to capture one or more first images including a first physical surface for use in a board game, wherein the at least one image sensor is configured to capture the first images according to an imaging frame rate;
   receiving circuitry to receive, via a network, one or more second images including a second physical surface for use in a same type of board game as the first physical surface;
   image processing circuitry to generate a sequence of composite images for display in response to the first images and the second images, wherein:
   a composite image includes at least a portion of a first image of the one or more first images and at least a portion of a second image of the one or more second images such that the composite image includes an image of a surface formed of the first physical surface and the second physical surface, and
   wherein the image processing circuitry is configured to generate at least one composite image from a previous composite image by modifying the previous composite image based on one or more of:

a difference between a previous first image and a current first image; and a difference between a previous second image and a current second image; and output circuitry to output the composite image for display.

2. The data processing apparatus according to claim 1, wherein the image processing circuitry is configured to overlay the first image and the second image, set one of the first image and the second image as an overlay image and increase a transparency for at least some of the overlay image.

3. The data processing apparatus according to claim 1, wherein the image processing circuitry is configured to select one or more portions of the first image and one or more portions of the second image and generate the composite image using one or more of the selected portions.

4. The data processing apparatus according to claim 1, wherein the image processing circuitry is configured to generate the composite image by adjusting at least one of the first image and the second image.

5. The data processing apparatus according to claim 4, wherein the image processing circuitry is configured to adjust, for at least one of the first image and the second image, one or more of:

a size of the image;

a transparency of at least some of the image;

a position of the image with respect to the composite image; and an orientation of the image with respect to the composite image.

6. The data processing apparatus according to claim 5, wherein the image processing circuitry is configured to adjust a size of at least one of the first image and the second image relative to the other of the first image and the second image to reduce a difference between a size of the first physical surface and a size of the second physical surface.

7. The data processing apparatus according to claim 1, wherein the image processing circuitry is configured to detect one or more corners associated with the first physical surface and the second physical surface and to adjust at least one of the first image with respect to the second image in dependence upon positions of the corners and the second image with respect to the first image in dependence upon the positions of the corners.

8. The data processing apparatus according to claim 7, wherein the image processing circuitry is configured to detect one or more of the corners by detecting one or more optically detectable markers in at least one of the first image and the second image.

9. The data processing apparatus according to claim 1, wherein the image processing circuitry is configured to generate at least one composite image of the sequence of composite images with one or more graphical indicators generated by the image processing circuitry, wherein the one or more graphical indicators are indicative of at least one of a target position and orientation for the first physical surface with respect to the image sensor.

10. The data processing apparatus according to claim 1, wherein a first portion of the first image includes a first physical object arranged on the first physical surface and a second portion of the second image includes a second physical object arranged on the second physical surface, and wherein the image processing circuitry is configured to generate the composite image for display to include the first portion of the first image and the second portion of the second image such that the composite image includes the first physical object and the second physical object in the image of the surface presented in the composite image.

11. The data processing apparatus according to claim 10, wherein the image processing circuitry is configured to generate the composite image by either selecting the first portion of the first image that includes the first physical object for inclusion in the composite image or increasing a transparency of a portion of the second image overlayed with the first portion of the first image.

12. The data processing apparatus according to claim 1, wherein the image processing circuitry is configured to:

adjust at least one of the first or second images to align the first and second physical surfaces;

identify differences in the physical surfaces between the first and second images; and output a composite image that preserves the identified differences.

13. The data processing apparatus according to claim 1, comprising transmission circuitry to transmit, via the network, data for at least one of:

one or more of the first images; and the composite image.

14. A data processing system comprising:

a first data processing apparatus including:

at least one image sensor to capture one or more first images including a first physical surface for use in a board game, wherein the at least one image sensor is configured to capture the first images according to an imaging frame rate;

receiving circuitry to receive, via a network, one or more second images including a second physical surface for use in a same type of board game as the first physical surface;

image processing circuitry to generate a sequence of composite images for display in response to the first images and the second images, wherein a composite image includes at least a portion of a first image of the one or more first images and at least a portion of a second image of the one or more second images such that the composite image includes an image of a surface formed of the first physical surface and the second physical surface, and wherein the image processing circuitry is configured to generate at least one composite image from a previous composite image by modifying the previous composite image based on one or more of:

a difference between a previous first image and a current first image; and a difference between a previous second image and a current second image; and output circuitry to output the composite image for display, and a second data processing apparatus, wherein the second data processing apparatus comprises:

one or more image sensors to capture the one or more second images;

transmission circuitry to transmit data for the one or more second images;

receiving circuitry to receive data for the composite image generated by the first data processing apparatus; and output circuitry to output the composite image for display.

15. A data processing method comprising:

capturing, by an image sensor, one or more first images including a first physical surface for use in a board game, wherein the image sensor is configured to capture the first images according to an imaging frame rate;

receiving, via a network, one or more second images including a second physical surface for use in a same type of board game as the first physical surface;

generating a sequence of composite images for display in response to the first images and the second images, wherein a composite image includes at least a portion of a first image of the one or more first images and at least a portion of a second image of the one or more second images such that the composite image includes an image of a surface formed of the first physical surface and the second physical surface, and wherein at least one composite image is generated from a previous composite image by modifying the previous composite image based on one or more of:

a difference between a previous first image and a current first image; and a difference between a previous second image and a current second image; and outputting the composite image for display.

16. The data processing method of claim 15, in which the step of generating the composite image comprises:

adjusting at least one of the first or second images to align the first and second physical surfaces;

identifying differences in the physical surfaces between the first and second images; and outputting a composite image that preserves the identified differences.

17. A non-transitory, computer readable storage medium containing a computer software which, when executed by a computer, causes the computer to carry out a data processing method by performing actions, comprising:

capturing, by an image sensor, one or more first images including a first physical surface for use in a board game, wherein the image sensor is configured to capture the first images according to an imaging frame rate;

receiving, via a network, one or more second images including a second physical surface for use in a same type of board game as the first physical surface;

generating a sequence of composite image for display in response to the first images and the second images, wherein a composite image includes at least a portion of a first image of the one or more first images and at least a portion of a second image of the one or more second images such that the composite image includes an image of a surface formed of the first physical surface and the second physical surface, and wherein at least one composite image is generated from a previous composite image by modifying the previous composite image based on one or more of:

a difference between a previous first image and a current first image; and a difference between a previous second image and a current second image; and outputting the composite image for display.

* * * * *